(12) United States Patent
Le Clément De Saint-Marcq et al.

(10) Patent No.: US 12,360,370 B2
(45) Date of Patent: Jul. 15, 2025

(54) HEAD-MOUNTED DISPLAY APPARATUS WITH AUTOFOCUS SYSTEM

(71) Applicant: IRISTICK NV, Sint-Martens-Latem (BE)

(72) Inventors: Vianney Le Clément De Saint-Marcq, Brussels (BE); Jasper Van Bourgognie, Berchem (BE); Riemer Grootjans, Antwerp (BE); Peter Verstraeten, Sint-Martens-Latem (BE)

( * ) Notice: Subject to any disclaimer, the term of this patent is extended or adjusted under 35 U.S.C. 154(b) by 645 days.

(21) Appl. No.: 17/636,115

(22) PCT Filed: Aug. 20, 2020

(86) PCT No.: PCT/EP2020/073314
§ 371 (c)(1),
(2) Date: Feb. 17, 2022

(87) PCT Pub. No.: WO2021/032828
PCT Pub. Date: Feb. 25, 2021

(65) Prior Publication Data
US 2022/0291509 A1   Sep. 15, 2022

(30) Foreign Application Priority Data

Aug. 20, 2019  (EP) ..................................... 19192635

(51) Int. Cl.
*G02B 27/01* (2006.01)
*G02B 7/32* (2021.01)

(52) U.S. Cl.
CPC ........... *G02B 27/0172* (2013.01); *G02B 7/32* (2013.01); *G02B 2027/0138* (2013.01); *G02B 2027/014* (2013.01); *G02B 2027/0178* (2013.01)

(58) Field of Classification Search
CPC .... G02B 2027/0178; G02B 2027/0138; G02B 7/32; G02B 27/0172
See application file for complete search history.

(56) References Cited

U.S. PATENT DOCUMENTS

| | | | |
|---|---|---|---|
| 5,742,263 | A | 4/1998 | Wang et al. |
| 2006/0038017 | A1 | 2/2006 | Carlson et al. |
| 2008/0277477 | A1 | 11/2008 | Thuries et al. |
| 2012/0261474 | A1 | 10/2012 | Kawashime |
| 2017/0308157 | A1 | 10/2017 | Tsuda et al. |
| 2019/0101756 | A1 | 4/2019 | Todeschini |

FOREIGN PATENT DOCUMENTS

WO   2021/032828 A1   2/2021

OTHER PUBLICATIONS

ISR/WO dated Nov. 26, 2020 for parent application No. PCT/EP2020/073314.

*Primary Examiner* — Ryan D Howard
(74) *Attorney, Agent, or Firm* — Vorys, Sater, Seymour and Pease, LLP (57) ABSTRACT

The current invention concerns a head-mounted display apparatus, preferably smart glasses, with autofocus system, whereby the alignment of lens assembly and light beam emitter is improved.

17 Claims, 6 Drawing Sheets

HEAD-MOUNTED DISPLAY APPARATUS WITH AUTOFOCUS SYSTEM

TECHNICAL FIELD

The invention pertains to the technical field of imager systems for head-mounted display apparatuses, in particular for smart glasses, whereby the head-mounted display apparatus comprises an image sensor with lens assembly and a light beam emitter (laser marker).

BACKGROUND

There remains a need in the art for an improved, compact (both in weight and dimensions) imager system for head-mounted display apparatuses with fast zooming and focusing capabilities.

As would be apparent for the skilled person, important limiting factors in this particular technical field are size and weight. The user wishes for an easy-to-use and easy-to-wear headset, which can be worn for a prolonged period of time (for instance during work). As such, the weight of each component is crucial, as the neck is not suited to support even very limited additional weights. Often, smart glasses weigh only a few hundred grams, and this weight is further reduced whenever possible.

Additional to a regular imager system having a traditional field-of-view comparable to the imager of a smartphone, the user wishes to have zooming capabilities. This is because an operator is used to move a phone closer to an object of interest in order to zoom in on it, but this is less convenient for the user to do so with smart glasses. This can be required during a Remote Assistance session where the scene is being streamed to a co-worker and a detail needs to be transmitted in high resolution; or for example in case a fine barcode has to be scanned. Both use-cases require an imager system capable of recording images with a regular field of view, as well as images with a much narrower, zoomed-in field of view.

In some use cases, it is desired to have simultaneous access to both the image with regular field of view as well as the image with narrower field of view.

In such cases, it is desired to have a mechanism which maps the scene as seen by the narrow field of view imager onto the image with regular field of view; allowing software applications to know which part of the regular view is available in higher resolution. This is quite challenging, as there is are offsets between both imagers which are not fixed because of the mechanical flexibility inherent to a pair of glasses. Furthermore, the zoom lens required for the narrow field of view imager typically has a larger physical size, making it desired to move away from the center of the headset, which is the desired position of the regular imager, hence increasing the lateral and angular offsets between both imagers.

Additionally, the user will require some way to direct and zoom in the camera system, and will require feedback on which part of the scene currently is zoomed in on.

However, since zoom lenses typically provide a small depth-of-field, typically a focusing mechanism is required to put the object in focus. The procedure of focusing the zoom lens on an object typically takes multiple seconds (especially in darker environments) and during this time the user is obliged to keep the smart glasses steady, which is an undesired limitation. Therefore, a fast way to focus the zoomed image is wished, ideally using a system which also works in darker environments.

Traditionally, this is accomplished by first measuring the distance to the object and using this distance to instantly set the lens in focus. In order to minimize the power consumption of the headset, as distance measurement based on trigonometry is desired which requires a base accommodating an emitter and imager. However, measuring the distance using such a method typically poses very strict requirements on a fine calibration of the base and a very rigid assembly thereof; which is far from evident on a headset which has be to light-weight and flexible. Additionally, in order to achieve sufficient accuracy the distance measurement typically require a large base while this is limited due to the physical dimensions of the glasses.

This is further complicated by variable angulation between the two components (for instance, due to stress on the headset, temperature effects, etc. can lead to variations both in distance as well as in angulation, which translate into incorrect focusing). The further the components are placed apart, the more angle variations can become an issue, as they are more likely to be present (a headset is usually at least somewhat flexible, to better follow the shape of head of different users, and not to exert undue pressure or forces when wearing, which thus can create unpredictable angulation variations between components). As the distance between the image sensor and the focus marker provider is typically very small (due to the dimensional limitations of the headset), even a small uncertainty in relative angulation between the two can have a large influence on the accuracy.

Additionally, the quality of not only the focusing but also of the acquired images should be sufficient both in bright and darker environments.

Documents such as US 2012/261474 (and to a lesser extent, US 2005/045725, US 2008/277477, US 2006/038017 and US 2004/263824) disclose barcode-reading apparatuses and the likes, wherein the lens system is provided with (auto)focus functionality. Additionally, some of the documents disclose the presence of add-ons such as a ranging laser, which however only functions as a laser rangefinder. The documents are however not directed to head-mounted display apparatuses, or smart glasses, and do not consider the issues that are involved with the incorporation of autofocus systems on such apparatuses. There are severe limitations due to dimension (as well as weight) to be considered, as well as a higher change of variation, in part due to the dimensional restrictions that impact the technical infrastructure of a HMD.

Alternatively, US 2015/302654 discloses a thermal imaging accessory for a HMD, which also includes a laser rangefinder in one embodiment. However, the laser rangefinder is disclosed as an add-on, and is a separate component.

SUMMARY OF THE INVENTION

The present invention provides an improved head-mounted display apparatus, and in particular smart glasses, with an autofocus system for focusing an object, according to claim 1.

DETAILED DESCRIPTION OF THE INVENTION

Unless otherwise defined, all terms used in disclosing the invention, including technical and scientific terms, have the meaning as commonly understood by one of ordinary skill in the art to which this invention belongs. By means of further guidance, term definitions are included to better appreciate the teaching of the present invention.

As used herein, the following terms have the following meanings:

"A", "an", and "the" as used herein refers to both singular and plural referents unless the context clearly dictates otherwise. By way of example, "a compartment" refers to one or more than one compartment.

"About" as used herein referring to a measurable value such as a parameter, an amount, a temporal duration, and the like, is meant to encompass variations of +/−20% or less, preferably +/−10% or less, more preferably +/−5% or less, even more preferably +/−1% or less, and still more preferably +/−0.1% or less of and from the specified value, in so far such variations are appropriate to perform in the disclosed invention. However, it is to be understood that the value to which the modifier "about" refers is itself also specifically disclosed.

"Comprise", "comprising", and "comprises" and "comprised of" as used herein are synonymous with "include", "including", "includes" or "contain", "containing", "contains" and are inclusive or open-ended terms that specifies the presence of what follows e.g. component and do not exclude or preclude the presence of additional, non-recited components, features, element, members, steps, known in the art or disclosed therein.

The recitation of numerical ranges by endpoints includes all numbers and fractions subsumed within that range, as well as the recited endpoints.

The term "laser" or "laser device", "laser emitter", "laser marker" or "light beam emitter" refers to a device capable of generating a focused light beam (typically a laser beam, although LED sources are capable of generating a collimated beam as well, especially when provided with further optics), for marking an object of interest (or indicating to a user an object of interest being captured by the first image sensor). Therefore, the invention at hand can be applied using other light beam emitters than laser devices as well, for instance LED sources which are adapted to provide a more focused light beam. As such, the term "light beam emitter" may be used as well in the document to indicate such devices. Additionally, the light beam emitter may or may not comprise additional optics, such as a collimating lens assembly, a diffraction grating and/or others.

The term "image sensor" or "imager" will be used intermixedly. When discussing "imagers" or "image sensors" in plural, this can refer to both a first and a second image sensor on the same apparatus.

In a preferred embodiment, the light beam emitter is a laser device, the light beams emitted thereby are laser beams, and the light spots created are laser spots or laser marks.

In a first aspect, the invention relates to an improved head-mounted display apparatus, preferably smart glasses, with autofocus system for focusing an object of interest, preferably an optical, machine-readable data representation, more preferably a bar code, said apparatus comprising:
  a. a first image sensor adapted for capturing images, said first image sensor comprising a lens assembly with variable diopter aligned to the first image sensor;
  b. a light beam emitter for generating a focused light beam for marking an object of interest, thereby indicating to a user the object of interest that is being captured by the first image sensor, wherein the light beam emitter is mounted on the apparatus oriented with respect to the lens assembly of the first image sensor so as to emit the focused beam within the field of view of the first image sensor;
  c. a temperature robust, one-piece mechanical assembly fixing said light beam emitter under a constant, predetermined angle to said lens assembly of said first image sensor;
  d. a driver module adapted for focusing the lens assembly of the first image sensor based on said triangulated distance;

wherein at least one or more of said images of the first image sensor used for triangulating the distance comprises a light spot from the focused beam, wherein the processor module is adapted for determining coordinates of said light spot based on the one or more images of the first image sensor, and wherein the triangulation of the distance is furthermore based on said coordinates of the light spot.

Preferably, said constant predetermined angle of the light beam emitter in view of the lens assembly of the first image sensor is about 0°. However, different angles in between the light beam emitter and the lens assembly of the first image sensor are also possible, as the most important aspect is the consistency of said angle, independent over time, and with none or minimal interference from temperature, shocks, etc.

The applicant found that, contrary to e.g. handheld barcode scanners or handheld zoom camera systems, visual guidance is required to indicate a key point certainly within sight of the camera system. Indeed, where a handheld device can be pointed into the direction of an object, this is not straightforward when the camera system is integrated into the headset. To this end, a laser pointer was integrated alongside the imager, serving as the light beam emitter.

Furthermore, the applicant found a way where use this laser pointer enables the comfortable usage of a zoom lens (lens with variable diopter). Typically a zoom lens requires a focusing procedure spanning multiple seconds, which would require the operator to keep the head steady during this time. Instead, the laser pointer is put in a secondary usage mode, allowing the system to calculate the distance to the object, which is then used to instantaneously focus the lens on that object.

Finally, by using a zoom lens, the applicant was able to significantly reduce the 'base', the distance between imager and laser diode, which is required to make this fit into a wearable device.

Preferably, the HMD apparatus comprises at least a generally longitudinal front section which is adapted to span across the forehead of a user. Preferably, the front section comprises temple sections at each longitudinal end, which may or may not extend to the ears of the user when worn. The front section is preferably flexible, allowing the longitudinal ends to be flexed at least 1.0 mm, preferably at least 2.5 mm, more preferably at least 5.0 mm, most preferably at least 1.00 cm, from their resting position.

In a preferred embodiment, the temperature robust mechanical assembly comprises a material with a linear thermal expansion coefficient ($\alpha$) of at most $250 \cdot 10^{-5}$ per Kelvin, this in order to further ensure the fixation of the light beam emitter and the lens assembly of the first image sensor under a constant angle. The light beam emitter has a marking mode and a ranging mode, wherein the light beam emitter operates in the marking mode in absence of detection of predetermined triggers, wherein the light beam emitter in the marking mode generates an optically visible marker detectable by the human eye on the object of interest, and wherein the light beam emitter is configured for entering the ranging mode upon detection of a predetermined trigger, wherein the ranging mode comprises the light beam emitter to emit at least one, and optionally two or more subsequent, light pulses thereby creating at least one, and optionally two or more subsequent, pulsed light spot on the object of interest.

Preferably, the central axes of the light beam emitter and the lens assembly of the first image sensor are distanced at least 0.10 cm from each other, preferably at least 0.25 cm from each other and more preferably at least 0.5 cm from each other. Preferably, said central axes are distanced at most 3.0 cm from each other, preferably at most 2.5 cm from each other, and more preferably at most 2.0 cm from each other.

One of the most crucial advantages, especially given the lack of space in most head-mounted apparatuses (for instance, smart glasses need to be compact, light and flexible), is that the amount of components is to be kept low. This also assists in reducing the fragility of the apparatus, its efficiency in operation, and in its cost. The current invention uses a light beam emitter to 'highlight' an object of interest, both for the user as well as for the range finding components of the apparatus. With most headsets with an inbuilt image sensor, problems are found in that a user may not always have a clear view on what is captured (or where the focus of the sensor lies). This can be somewhat accommodated by providing a digital display showing said capture zone, but that requires the user to focus his or her attention away from the 'real' world, i.e. the view in front of him or her, needing the user to switch back and forth between digital display and their view. The present invention uses a light beam emitter to very specifically indicate the zone/object of interest for the user, of which the distance is determined to the user, which distance is then used for focusing the image sensor. This way, the invention has the advantage of providing real-world indications that the image sensor is aimed correctly, as the user can correct their aim based on the visible light spot generated by the light beam emitter. The light beam emitter thus doubles as a marker/aiming assistance, and as a reference for the distance determination for the autofocus. The dual usage reduces the necessary space and weight in/on the HMD. By using the light beam emitter as a marker which is positioned in the same holding assembly as the first image sensor, it is furthermore ensured that the image sensor actually has the same focus point as the marker. In many head-mounted apparatuses, there is an inherent flexibility to fit the apparatus on a variety of user their heads. The significant variation in human head size can (slightly) deform the apparatus, which has far-reaching consequences for angle-sensitive devices such as image sensors. If the image sensor is angled differently in view of the light beam emitter, the focus point of the sensor will differ in view of the intended focus point as visualized by the light spot generated by the light beam emitter. The present invention holds the two components in a temperature-robust holding assembly to ensure minimal variation.

It should be pointed out that in the prior art systems, the light beam emitter (generally a laser pointer) is part of a range finder, but is separate from the image sensor. Time of flight is used to determine the distance, but this is not necessarily the distance to the focus point of the image sensor. The present system combines these aspects in order to ensure that the focus point of the light beam emitter is also used with the image sensor to determine the distance, ensuring a correct autofocus and centering of the sensor, as opposed to the prior art where imaging and distance detection are separate processes done by separate subsystems.

By employing a marking mode and a ranging mode, the use of the light beam emitter is made more efficient and more flexible. In the marking mode, the light beam emitter preferably generates a continuous light beam, which produces a (continuous) light spot on a target that is visible to the user. The user can trigger the ranging mode via a number of predetermined actions on his or her end, which will be discussed further. Upon detection of such a trigger, the light beam emitter will commence ranging mode, typically by generating one or more light pulses, which are detected by the image sensor and based on which detection, the distance to the object of interest (focus) is calculated. Considering that the time necessary for detecting the distance is extremely short, this will not lead to any issues with the user, who will have lost his or her focusing point for a very limited time (if it is even long enough to be detected). However, as this time duration is shorter than the average human's reaction time, this will not impact the steadiness of the HMD, especially as the marking mode will recommence upon finalization of the ranging mode.

Preferably, the ranging mode has a maximal duration of 100 ms, after which marking mode is recommended. More preferably, the duration is at most 50 ms, 25 ms, 10 ms, 5.0 ms, 2.5 ms, 1.0 ms, 500 µs, 250 µs, 100 µs, 50 µs, 25 µs, 10 µs, 5 µs, or at most 2.5 µs, or even at most 1.0 µs.

The light beam emitter of the invention is chosen such that it can produce a visible light spot on a generic surface (that reflect impinging light diffusely), such as cardboard, from a distance of at least 0.5 m in an indoor setting (i.e. without daylight, but with standard industrial lighting, such as in warehouse settings; requirements can be found in for instance the OSHA regulations, providing minimally about 21.5 lumen per square meter; other such regulations can be applied as well). With "visible", it is meant that an average person (with average visual acuity or 20/20 vision) is able to detect the light spot under the above circumstances. Preferably, the minimal distance over which the light spot is visible is at least 1.0 m, more preferably at least 1.5 m, 2.5 or even at least 5.0 m. Most preferably, the light spot is visible over a distance of at least 7.5 m, even more so for at least 10.0 m, 15.0 or even at least 20.0 m.

Most preferably, the light beam emitter has a maximal power of 5.0 mW, more preferably at most 2.5 mW, even more preferably of at most 1.5 mW, most preferably of at most 0.9 mW. The latter boundary ensures a 'class 1' label, making it safe for all conditions of normal use, which mainly focus on potential danger to the naked eye. However, it can be imagined that in certain (typically industrial) settings, higher power emitters are necessary if visibility at all times needs to be guaranteed. Most preferably, the light beam emitter is a laser marker.

The predetermined triggers may comprise one or more, preferably all, of the following: voice activation via predetermined command word or phrases (for instance "ranging mode on"); touch input (via button, touch screen or the likes on the HMD), possibly via predetermined touch inputs, such as a 'double tap'; input via a wiredly connected electronic device, such as a smartphone, tablet or the like; input via a wirelessly (for instance Wi-Fi, ZigBee, Bluetooth, BLE, 3G, 4G, 5G) connected electronic device, such as a smartphone, tablet or the like (may be from a close-by device, such as the cellphone of the user, but can also; predetermined movement/tiling sequences/patterns, which movements are preferably based on angular variations (for instance, sequence of tilts of the apparatus in certain directions such as left-right); absence of movement (translation) and/or angular variation (rotation) over a predetermined time, wherein absence is to be considered as an amount of movement and/or angular variation of the apparatus over a predetermined time being below a predetermined amount, indicating a user maintains the position of the apparatus. Detection of this movement/angular variation can be accomplished via an accelerometer, gyroscope and/or other means. It is specifically the absence of angular movement, preferably combined with the absence of translation of the apparatus, that is most efficient as a trigger, as the apparatus can most efficiently determine distance when the position of the apparatus is maintained stationary.

In a preferred embodiment, maximal variation of the alignment of the first image sensor and light beam emitter is at most 0.25°, preferably at most 0.1° or even 0.05° and 0.01°. Again, this is achievable by using a single-piece holding means that serves as a fixating structure for both the light beam emitter and the first image sensor.

The applicant found that existing autofocus systems were never, or poorly adapted for use on head-mounted display apparatuses, and in particular to smart glasses, and their particular characteristics (weight and dimensions for instance). As such, in order to successfully implement an autofocus system on such apparatuses, certain adjustments are necessary. In a first comment, it is to be pointed out that a head-mounted display apparatus is at least somewhat flexible over the length from temple hinge to temple hinge (in the case of glasses), in order to fit comfortably for the average user. In a second comment, this section is often thin (to reduce weight), and thus more easily influenced by external forces, allowing small deformations by small applications of force or pressure. This can create variations in the relative orientation of the light beam emitter and the image sensor, which are not taken into account in subsequent triangulation of distance, resulting in an incorrect calculated distance and a bad focusing of the system.

Lastly, we note that some have tried to solve the problem of providing an accurate distance estimate by providing a large 'base', the distance between the light beam emitter and the image sensor, which makes triangulation using said base more robust. However, this is only useful when the angle between the two components is constant, which is clearly not the case, in fact, observations indicate that by distancing the two components further, the problem of variations in orientation is even aggravated, thereby fully invalidating the intended effect of this 'solution'. It is in this light that the applicant sought to ensure that the orientation of the light beam emitter and image sensor were kept constant throughout use by positioning them substantially adjacent to each other and fixedly mounting them in a single-piece holding means/mechanical assembly. Due to their proximity, the smallest variations in relative angle can have a tremendous impact on the triangulated focus distance, but this is prevented by the applicant's measures.

In a preferred embodiment, the light beam emitter (laser device) and the first image sensor are positioned substantially at a lateral position of the head-mounted display apparatus, i.e. towards the ear hinges if present, for instance in smart glasses. This positioning generally can be maintained quite rigid, as flexibility of the apparatus would be preferably made possible around the central zone, as it should follow the general structure of a head. This makes the lateral sides more reliable and thus further ensures that the angulation of lens assembly and light beam emitter (laser) are maintained throughout the use.

In a preferred embodiment, the laser can be put in "Pointer Mode", where it emits a beam at constant intensity, preferably dictated by the laser classification class targeted for the product. Additionally, the laser can be put in "Distance Measurement Mode", which allows the imager to capture an image with laser dot as well as an image without laser dot. Since the capture time of the image with laser dot can be limited, the laser is emitting at a higher intensity than during regular Pointing mode. This makes it easier to detect the coordinates of the laser spot in the image, without causing the device to classified in a more dangerous laser classification.

In a preferred embodiment, the apparatus comprises a second image sensor adapted for capturing images, said second image sensor comprising a wide-angle lens assembly, and mounted wherein the beam is emitted within the field of view of the second image sensor, wherein the processor module is configured for mapping the images from the first image sensor on the images of the second image sensor based on the positions of the light spot in essentially simultaneously captured images from the first and the second image sensor. For this second image sensor, instead of a single image sensor, multiple sensors can be used of which the images can be combined.

In a particular embodiment, the second image sensor may be a system comprising two or even more separate cameras, with separate lens assemblies.

In a preferred embodiment, the apparatus comprises a second image sensor adapted for capturing images, said second image sensor comprising a wide-angle lens assembly, and mounted wherein the light beam is emitted within the field of view of the second image sensor, wherein the processor module is configured for mapping the images from the first image sensor on the images of the second image sensor, said mapping being based on offset and angle between the lens assembly of the first image sensor and the lens assembly of the second image sensor, said offset and angle being: predetermined; or derivable from at least two simultaneous successful detections of the light spot in images of both the first and the second image sensor.

Under certain circumstances, it can be advantageous to employ a secondary image sensor which is specifically adapted for capturing objects at short distances, while the first image sensor on its own is more adaptable and suitable for capturing objects at longer distances. Said secondary image sensor can be a 'normal' lens, preferably fixed-focus, as opposed to the first image sensor which is preferably a zoom lens, more preferably a liquid zoom lens as this allows more compact formations better suited for wearable devices. In this case, it is advantageous to allow the second image sensor to be positioned at a larger distance from the light beam emitter, which increases the base for triangulating distance to the object to be observed. However, the larger distance between the two components creates a likelihood of a variable angle (as noted before, depending on the wearer, depending on forces exerted on the headset, depending on temperature, etc.). In order to overcome this difficulty, the variable angle between the two components is determined and calibrated for. Based on this calibration, the distance to the object of interest can be determined and the lens assembly of the first image sensor can be focused optimally. It is furthermore advantageous to have both imagers running concurrently in certain circumstances. The (first) field of view of the first image sensor will be smaller than that (second field of view) of the second image sensor, and will thus form part of said second field of view. On such occasions, it is important to find the 'position' of the first field of view in the second field of view, or to map the zoom image onto the wide-angle image. This can provide the user some feedback on whether or not he or she is aiming at the correct object of interest. The light spot emitter will not always produce a visible spot (due to lighting conditions, object material, or even vision of the user, and others), while it remains crucial to give the necessary feedback. Options are for instance using a display on the head-mounted apparatus in which the zoom image is visible, or by using a display on which the wide-angle image is displayed and in which a region is marked (crosshairs, rectangular frame, etc.) to show the zoom image (borders) in the wide-angle image. The second option is especially useful as the displayed image will not shift too strongly by small movements of the apparatus (head movements).

As such, it is beneficial to provide for fast, accurate, and energy-efficient mapping between both imagers. Even though the relative field of view of both imagers will remain the same, the horizontal and vertical offset between them will cause the mapping to still have some variation, mainly depending on distance between imagers and objects. Furthermore, it should be noted that any angular difference between both imagers will enlarge the dependency on said distance. As mentioned before, given that the concept relates to a head-mounted apparatus (for instance smart glasses), the imagers can undergo some variations in position relative to each other, making the angulation between the two imagers at least somewhat variable (as well as the distance therebetween in theory), meaning that it cannot be simply calibrated, and requiring a dynamic way to determine the mapping.

A first option would be via matching software using image processing techniques to 'recognize' the position of the images of the first imager in the images of the second imager. However, this is very CPU intensive (requiring heavy calculations at all times), and thus necessitating more hardware to be integrated in the apparatus just to run it (extra weight) as well as an enormous increase in power consumption (either requiring more energy capacity, and/or more frequent charging), and increase heat generation, which is highly uncomfortable.

A second option is by detecting the position of the light spot in each image, which would provide a single reference point, after which the mapping can be inferred based on the field of view of both imagers. However, as mentioned previously, it will often be challenging to detect the light spot in both imagers, especially in the wide-angle imager considering the light spot will be represented by only a few pixels in the image. Considering that the lighting conditions may be poor, and that the material on which the spot is marked may be unsuitable, it will not always be possible to detect the light spot in both images.

Therefore, in a third option, the mapping may also be obtained based on solely the coordinates of the laser pointer in the image of the first image sensor (zoom image), and on the offsets and angle between both imagers.

This is very beneficial, as the light spot is represented by a much larger area in the zoom image (of the first image sensor), making the detection much more robust. In case the angle between both imagers is fixed, the light spot will traverse along a fixed line on the image of the second image sensor depending on the distance between light spot emitter and object. So once the light spot has been detected on the zoom image, the distance to the object can be derived (as explained elsewhere in this document) after which the position of the light spot in the wider image can be derived, allowing the full mapping of the zoomed image onto the wider image can be inferred based on the field of view of both imagers.

As stated, the angle between both imagers can change, for example when another operator is wearing the apparatus (for instance requiring an adaptation to provide a better fit, or simply slightly moving the two imagers relative to each other). In such case, two successful detections of the light spot by both the first image sensor and the second image sensor are sufficient to determine the new angle between both image sensors. As soon as this new angle has been determined, detection of the light spot by the first image sensor alone is sufficient for a correct mapping of images of the first image sensor onto images of the second image sensor.

The combination of the first and second image sensor, along with the light beam emitter, allow for an optimized imaging system which can give the operator a perfect overview on the center of focus of the image sensors, requiring very limited additional electronic components which would burden the user.

The first and/or second image sensor is preferably a digital image sensor, such as a CMOS or Charge Coupled Device (CCD) sensor. The image sensor can be a monochrome or RGB sensor.

In a further preferred embodiment, the processor module is configured to map the images based on said predetermined or derived angle and offset, by detecting the light spot in images from the first image sensor; subsequently determining the distance from the lens assembly of the first image sensor to the surface which the light spot marks; based on said determined distance and the predetermined or derived angle and offset, calculating the position of the light spot in images from the second image sensor; based on the said calculated position, map the images of the first image sensor on the images of the second image sensor.

Preferably, the apparatus further comprises an electronic display for displaying digital images visible to a user wearing the apparatus. More preferably, the electronic display is configured for displaying the images of the second image sensor, and the electronic display is configured for displaying the images of the first image sensor in the displayed images of the second image sensor via overlay, wherein the images of the first image sensor are marked with respect to the images of the second image sensor.

The second image sensor, and the image generated by it, is especially useful in outdoor situations. Where the operator can use the light beam emitter as a marker and as an aiming assistance (and distances are more limited), ensuring the image sensor is aimed at an intended target in indoor situations, where lighting is more controlled and less variable, this is more difficult outdoors, where ambient lighting changes strongly throughout the day. Additionally, objects are usually less clustered, making the distances greater. In order to save time, the operator wishes to be able to aim correctly but also quickly, and does not wish to approach each object of interest up to a certain distance, but wishes to be able to aim correctly from distance. The light beam emitter used in the apparatus cannot be improved infinitely, boosting power and range, and therefore, a more limited light beam emitter is chosen, which is only used in indoor situations. For outdoor situations, the light beam emitter is no longer used in its functionality as a visible marker for the operator. Instead, the two image sensors (first and second) are combined, in that the image of the first is a segment of the image of the second image sensor. By displaying both on a digital display of the HMD in overlay, and marking the image of the first image sensor in the image of the second image sensor, the operator receives feedback on whether or not his or her aim is correct, and can correct when necessary.

It should however be understood that the use of this overlay function to visualize the aim of the image sensors is not solely reserved for outdoor situations, and can be preferably be toggled on and off.

In a preferred embodiment, the images of the first image sensor are marked with respect to the images of the second image sensor via a rectangular demarcation.

In a preferred embodiment, the light beam emitter and the second image sensor are spatially separated over at least 25% of the breadth of the apparatus, preferably wherein either the light beam emitter or the second image sensor is positioned centrally on the apparatus and the other is positioned laterally on the apparatus.

In a preferred embodiment, the lens assembly of the first image sensor and the lens assembly of the second image sensor are distanced over at least 4.0 cm, preferably over at least 5.0 cm, more preferably over at least 7.0 cm.

In a preferred embodiment, the lens assembly of the first image sensor and the lens assembly of the second image sensor are distanced over at most 14.0 cm, preferably over at most 11.0 cm, more preferably over at most 9.0 cm.

Preferably, this is due to one (preferably the first) of the lens assemblies being positioned essentially central on the head-mounted display apparatus (i.e. above the nose/between the eyes of the wearer), with the other being positioned at one of the lateral sides (ears) of the apparatus.

In a preferred embodiment, said mechanical assembly comprises a material with a linear thermal expansion coefficient (a) of at most $250 \cdot 10^{-5}$ per Kelvin, preferably at most $125 \cdot 10^{-5}$ per Kelvin.

A further important aspect in the invention lies in ensuring that the holding means doesn't allow the first image sensor and light beam emitter to lose alignment. Most importantly, this could be caused by temperature increases or decreases which affect different materials and components differently. By ensuring that the holding means doesn't substantially deform when faced with temperature changes, the alignment of the two components is substantially secured. It is in this light a material needs to be used for at least part of the holding means that does not deform significantly under temperature variations, and as such, has a low LTE coefficient as defined above.

It is especially noted the advantageous application of the above materials for the holding means, as it not only possesses the necessary characteristics in terms of temperature-dependence (LTE coefficient), but also does not allow light to pass through, and can thus shield light emitted by the light beam emitter from the first image sensor, which could severely impact the trustworthiness of any measurements by the image sensor. This is for instance achieved by providing two separate holding chambers for the light beam emitter and for the first image sensor.

In a preferred embodiment, the central axes of the light beam emitter and the lens assembly of the first image sensor are distanced at least 0.10 cm from each other, preferably at least 0.25 cm from each other and more preferably at least 0.5 cm from each other. Most preferably the distance is at least 1.0 cm from each other. It is to be noted that this minimal distance is in part dictated by the physical dimensions of the lens assembly.

In a preferred embodiment, the central axes of the light beam emitter and the lens assembly of the first image sensor are distanced at most 3.0 cm from each other, preferably at most 2.5 cm from each other, and more preferably at most 2.0 cm from each other. Even more preferably, this distance is further reduced to at most 1.5 cm.

As mentioned previously, the distances between the light beam emitter and first image sensor (or its lens assembly) dictates the base that is used in triangulating the distance to the observed object. A small base would allow for a larger margin of error but has the advantage of high certainty of the relative angulation of the two components remaining constant. A larger distance, i.e. a larger base, reduces the margin of error, while the chance of variations on the relative angulation is increased. The applicant found that the above ranges were especially beneficial, especially when combined with a housing (mechanical assembly) that guarantees the steady alignment of the emitter and first image sensor.

In a preferred embodiment, the lens assembly of the first image sensor is provided with a temperature sensor adapted for measuring the temperature of said lens assembly and whereby the focusing of said lens assembly takes said measured temperature into account.

Note that in slight variations, a temperature sensor might be present near the lens assembly (for instance inside of the mechanical assembly), in order to measure a temperature strongly approximating the temperature of the lens assembly.

In a particularly preferred embodiment, the temperature sensor is provided within the holding means. Preferably, the temperature sensor is communal for the lens assembly and the light beam emitter (laser device). Alternatively, separate temperature sensors are provided for the lens assembly and the light beam emitter (laser device).

Preferably, the temperature sensor is positioned free-hanging, in order to be adapted for measuring the temperature within the holding means, which is generally equal to that of the lens assembly and/or light beam emitter (laser device).

As mentioned, temperature typically affects different materials differently, which is especially true for highly sensitive devices such as used in the invention. Minimal changes can impact accuracy severely, and are thus to be avoided as much as possible, and where they cannot be avoided, need to be accounted for and corrected. By measuring the temperature, the impact on the lens assemblies can be estimated and then be corrected for.

In a preferred embodiment, the apparatus comprises an accelerometer for providing acceleration input to the processor module, whereby the processor module is adapted to engage in a scanning modus upon detection of a threshold of stability over a certain time length from the input of the accelerometer, said scanning modus comprising the triangulation of the distance between the apparatus and the light spot, and subsequently the focusing of the lens assembly of the first image sensor based on said triangulated distance.

Especially when dealing with headsets or smart glasses, manual interaction with the device itself is to be avoided, as this can influence the device (by movement, exertion of pressure and forces, etc.), so other trigger become necessary. Aside from voice command, an accelerometer can be used to recognize certain predefined triggers via movements.

In a preferred embodiment, the apparatus comprises a flash LED module substantially aligned with the light beam emitter and the lens assembly of the first image sensor, whereby the processor module is adapted to control said flash LED module for illuminating the field of view of the first image sensor.

This can allow the device to provide sufficient illumination for improved SNR (signal to noise ratio) during the image acquisition. The ambient light level extracted from a previous image can be used to control the intensity of such additional scene illumination.

It is important that the timing of the LED flash coincides with the capturing time of the image sensor. This is implemented in a controller which controls the timings of both; either as independent master, or based on the timings dictated by the imager and its timing signals.

In a preferred embodiment, the head-mounted display apparatus comprises, and preferably is, smart glasses. It should be understood that the specific application to smart glasses introduces a number of extra difficulties, such as low weight, optimized energy consumption, reduction of heat generation, reduction of CPU requirements, taking into account flexibility of the smart glasses (for instance at the nose bridge).

In a preferred embodiment, the central axes of the lens assemblies of the first and second image sensor are variably angled, preferably whereby the first and second image sensors are positioned with a flexible section therebetween.

In a preferred embodiment, the processor module is adapted to manipulate the angulation of the first image sensor, thereby shifting the field of view thereof.

In a preferred embodiment the autofocus system comprises a memory to store the acquired images.

In an embodiment the processor module is arranged for being connected to an external device from which control data can be received.

EXAMPLES

Figure 1:
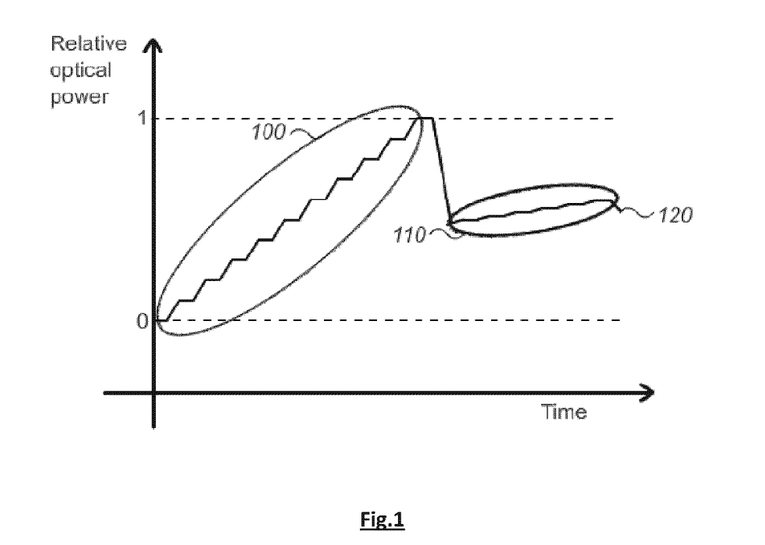
FIG. 1 illustrates a closed-loop sweeping method.
Figure 2:
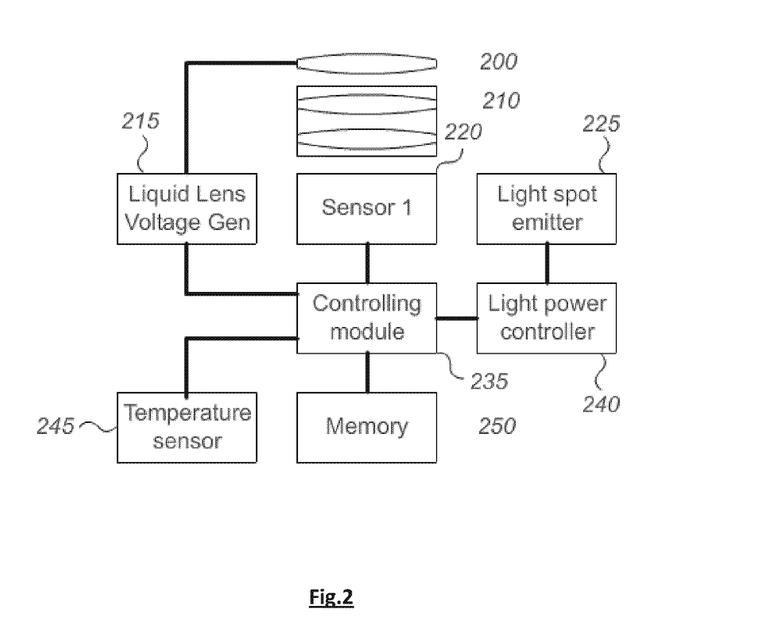
FIG. 2 illustrates an embodiment of the autofocus system of the invention with a single lens.

A first embodiment of the autofocus system of the invention is illustrated in FIG. 2. The system has one image sensor in its set-up. The first image sensor (220) is aligned to a liquid lens assembly with variable focal length. This lens assembly typically comprises a fixed-focus part (210) and an adjustable liquid part (200). The first image sensor (220) is used to capture the light spot generated by light beam emitter 225.

The light beam emitter (225) can be based on a light source such as LED or laser device, with or without additional optics. Such optics can include a collimating lens assembly or a diffraction grating. The system contains in this embodiment a digital image sensor (220), such as a CMOS or Charge Coupled Device (CCD) sensor. The image sensor can be a monochrome or RGB sensor. On top of the sensor (220) is a lens assembly (200, 210). The focal length of the lens assembly can be modified by adjusting the voltage wave applied on the liquid part of the lens (200). The voltage wave can be DC or AC, such as a 1 kHz square wave of 150V peak-to-peak. The autofocus system contains a generator module (215) which is capable of providing such voltage wave. The autofocus system furthermore contains a temperature sensor (245). The generator module and the temperature sensor can be configured and read out by a processor module (235) at runtime. This processor module can control the sensor(s), read them out, store images in a memory (250), evaluate a sharpness function on these images, detect the light spot coordinates, convert these coordinates into an optimal voltage to be applied to the liquid lens for the target object to be in focus and configure the module (215) that generates the voltage wave based on the resulting value of the sharpness function. A sharpness function provides a real-valued estimate of an image's sharpness. Many sharpness functions are known in the art. The processor module can be connected to a remote device, to which data can be sent and from which data can be received. The remote device can send commands to the processor module and take over control of the processor module.

Figure 3:
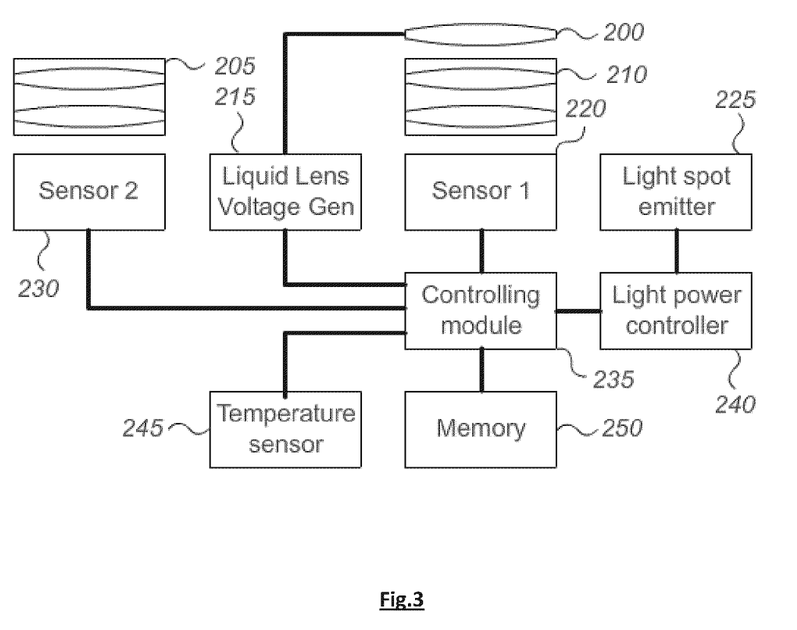
FIG. 3 illustrates an embodiment of the autofocus system of the invention with two lenses.

In the embodiment of FIG. 3 the autofocus system comprises not only a first image sensor (220), but also a second image sensor (230) aligned to a second lens (205) which typically has a fixed focus. This second image sensor is added to also capture the light spot and focus the liquid part of the first lens based on the coordinates in the image of the second image of said light spot. The second image sensor (230) is connected to the controller module (235). For the rest the autofocus system in the embodiment of FIG. 3 is substantially the same as the one in FIG. 2. Finding the optimal voltage for the first lens through detection of the light spot through the second lens (205) and sensor (230) can be advantageous in a multitude of cases, e.g. to adjust the focus of the liquid part of the first lens without disturbing the first sensor. This is advantageous when the first sensor (220) is capturing a continuous stream of video. Furthermore it can be advantageous to use the second sensor (230) for focusing of the liquid part of the first lens in case the second sensor is physically better suited for this: when its distance to the light beam emitter and focal length results in a better resolution for determining the coordinates of the light spot and, hence, the resulting optimal voltage for the first lens, or when the distance and alignment of the second lens and sensor to the light beam emitter is more robust against environmental changes such as temperature, compared to the first lens and sensor.

The sensor(s) (230, 220) and light source (225) are assumed to be sufficiently well-aligned. This allows for the use of a linear combined model, leading further in this description to simplified mathematical expressions. The parameters for the model are assumed to be known. For example, the parameters may have been retrieved during a calibration procedure by fitting a straight line through a series of measurements at known distances. Special care is to be taken mechanically that the alignment between lens and light source remain as stable as possible, to obtain a maximum variation of less than 0.1 degree. To this end, materials are used which are resistant to vibrations and temperature change. If the alignment between the lens orientation and the light source (225), i.e., the angle θ, changes after calibration, the parameters for the autofocus system can be recalibrated with a single measurement and a slow closed loop auto-focusing method.

Figure 4:
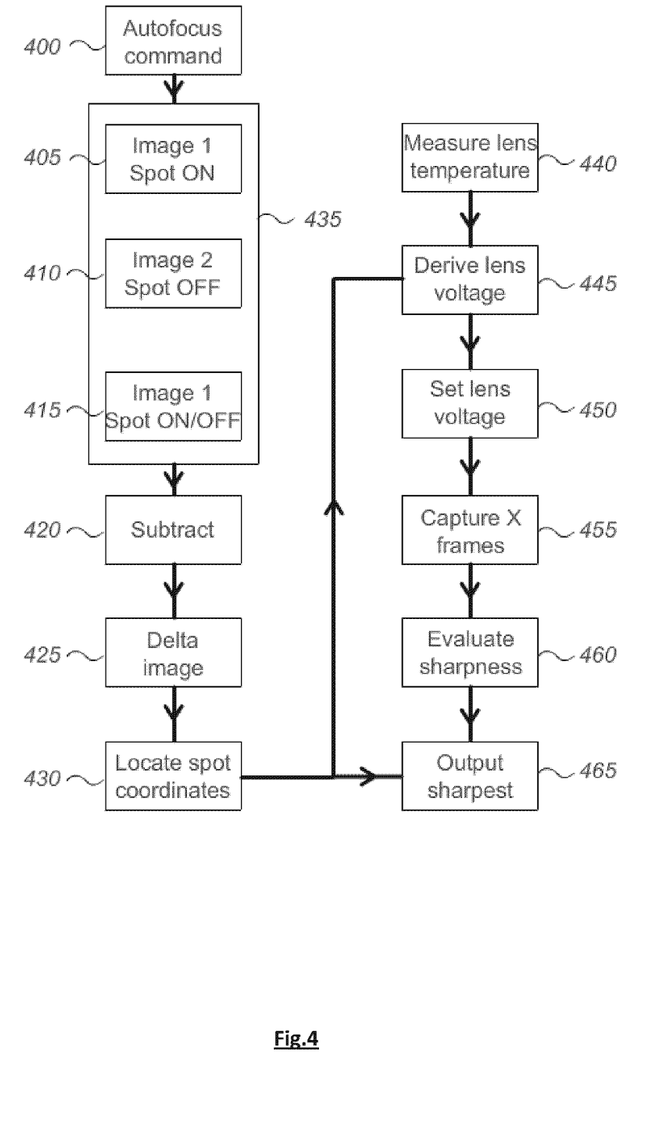
FIG. 4 illustrates a flowchart of a variation of the proposed autofocusing approach.
Figures 5, 5A, 5B, 5C:
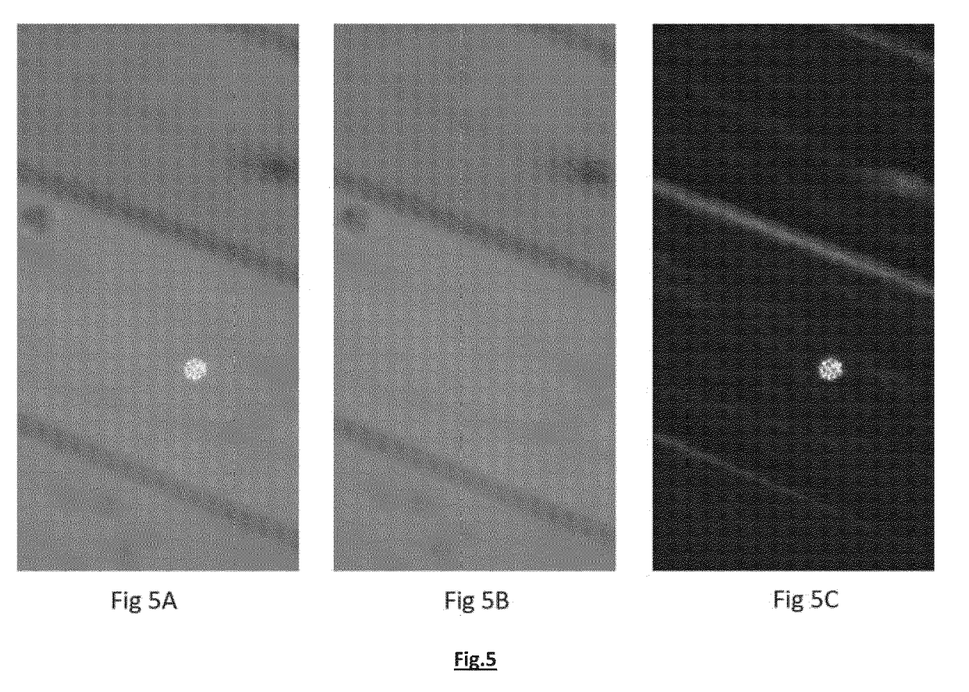
FIG. 5 illustrates images with light source enabled and disabled, respectively, and their resulting delta image.

FIG. 4 illustrates a variation of the method for focusing the liquid lens through reflected spot coordinate measurement. The method starts after an autofocus command has been received by the processor module. This autofocus command can originate from a remote device to which the processor module is connected, or from any control mechanism inside the processor module itself. Once the autofocus command has been received (400), the laser controller is punt in "Distance Measurement Mode", and images are acquired (435) to detect the light spot coordinates. At least two images are acquired with a very low exposure time: one with the light spot enabled (405, FIG. 5A), which is stored in memory (250), and one with the light spot disabled (410, FIG. 5B), also stored in memory (250). The difference (420) of the latter image with the former can be converted by the controlling g module (235) in a delta image (425, FIG. 5C) where the light spot is the brightest spot in the image, provided that the two images are acquired one shortly after the other. Notice that in FIG. 5 any movement between steps 405 to 415 results in a delta image containing other objects as well. However, using conventional image processing algorithms it is possible to detect the light spot coordinates in most cases. To improve robustness, particularly in brightly lit environments, more images can be captured (415) and averaged. Good results are obtained by capturing three images: one without light spot, one with light spot and again one without light spot. Using more images can result in better spot detection performance. Additionally, in order to improve the light spot detection success rate, the first image can be used to detect the ambient light level (405), based on which the acquisition time for the subsequent images can be adjusted to avoid saturation and provide optimal SNR levels. Additionally, based on the analysis of one of the images captured in 435, for example the first image (405), the processing module (235) can decide to change the amplitude of the light source (225) in order to increase the success rate of detecting the light spot. To this end, the light power controller (240) is so configured that the light beam emitter (225) emits the desired amount of optical power.

In one embodiment, in order to optimize readout time, only the sensor area is read out on which the light spot can possibly be projected. In case a color imager is used to detect the location of the light spot and in case the light spot wavelengths are closest to either red, green or blue, only that particular color channel can be read out. The other channels then contain almost no useful information regarding the position of the light spot. Doing so yields an additional speed improvement.

The useful images without light spot are averaged and the result is subtracted from the averaged useful images with light spot. Standard image segmentation algorithms (430) can be applied to find from the delta image (425) the image coordinates of the light spot center, i.e., the brightest spot.

In a next step the image coordinates of the captured light spot are converted (445) through the equations presented later in this description into an optimal voltage for the liquid lens assembly at which the target object is in focus. The resulting voltage is then set on the liquid lens (450), resulting in the target object being in focus. Finally, a series of images are captured (455) with various voltage settings around the computed ideal voltage. The resulting images are stored in memory (250). A sharpness function is evaluated on all images (460) and the best-focused image (i.e. the image with the highest sharpness function score) is selected and presented together with the light spot coordinates to the component which issued the autofocus command. Acquiring multiple images around the ideal setting further improves the robustness of the system against measurement inaccuracies or small parameter variations. Alternatively, instead of simply capturing images with a predefined number of settings around the calculated optimal point, the additional set of images (455) can be acquired according to a search algorithm, allowing selection of the optimal image from a larger search space.

The following paragraphs explain in more detail an embodiment of the algorithm to derive the lens voltage, i.e. the algorithm running in the block 445 of the flowchart of FIG. 4. A laser pointer has been used as light beam emitter. Given the light spot coordinates, the optimal lens power and subsequently the optimal liquid lens voltage is calculated, compensated for the ambient temperature.

Figure 6:
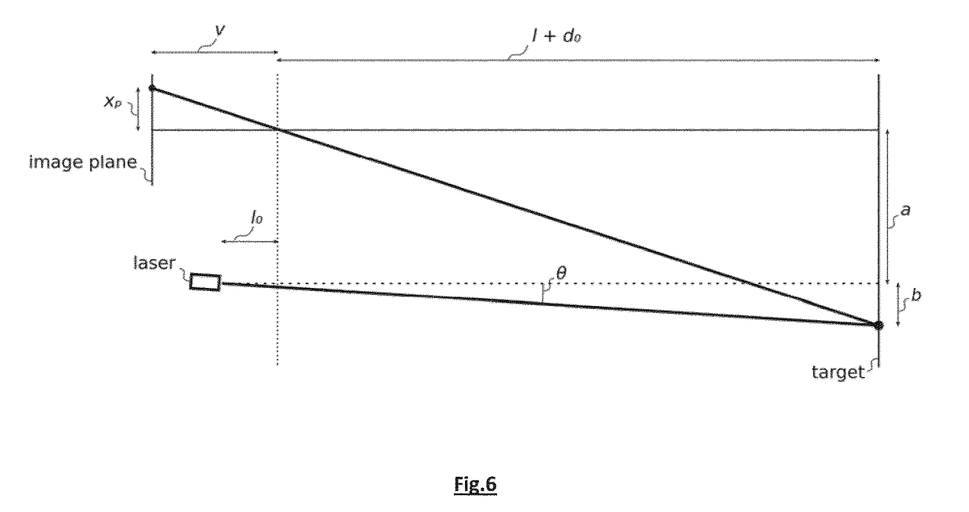
FIG. 6 illustrates a geometrical representation of the optical elements and their axes.

With the coordinates of the light spot known, the voltage level to be configured in the liquid lens voltage generator (215) can be derived for the object of interest to be in focus. FIG. 6 shows how the light spot is projected on the image sensor's image plane according to the pinhole camera model (assuming the lens does not introduce any distortion) in one dimension. By triangle similarity, the following equation holds:

$$\frac{a+b}{d+d_0} = \frac{x_p}{v} \Rightarrow x_p = \frac{(a+b)v}{l+d_0}$$

where $l+d_0$ denotes the distance to the target object (whereby d0 is a correction accounting for the fact that the pinhole model is not 100% exact), $x_p$ the offset between the projected light spot on the image plane and the center of the image sensor, v the distance between the pinhole and the image plane (usually equal to the focal length when focused at infinity), a the distance between the axis of the light source and the lens and b the offset of the light spot on the target incurred by misalignment of the laser pointer with respect to the lens.

The misalignment of the laser pointer is described by the distance l0 between laser and pinhole and the angle θ between laser and lens orientation. The offset b can be derived from these parameters:

$$\tan\theta = \frac{b}{l_0 + l + d_0} \Rightarrow b = (l_0 + l + d_0)\tan\theta$$

The offset $x_p$ can be found starting from the pixel coordinate x on which the light spot can be seen in an acquired image, thereby considering the pixel size c and the offset in pixels $x_0$ to the sensor center:

$$x_p = c(x+x_0)$$

Combining these three equations, one gets $$l = \frac{(a + l_0\tan\theta)v}{c(x + x_0) - v\tan\theta} - d_0 \quad (1)$$

Figure 7:
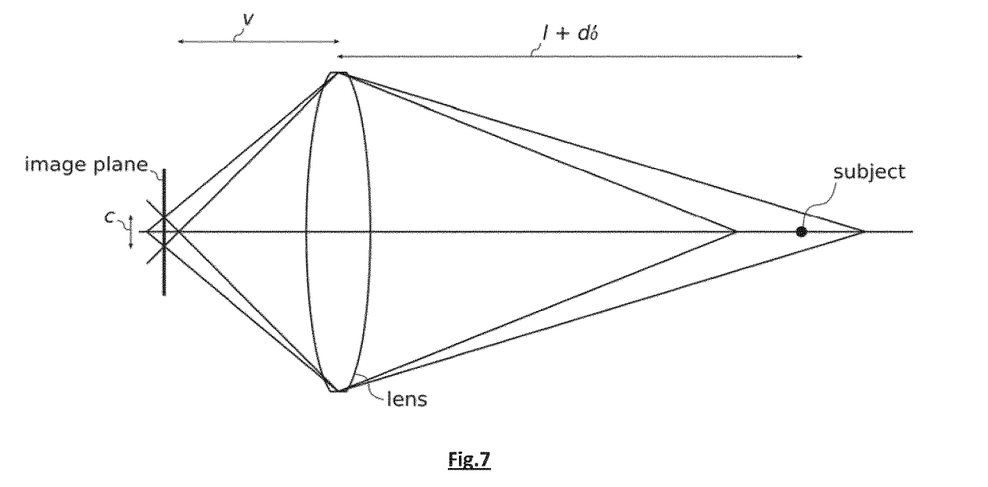
FIG. 7 illustrates a depth-of-field representation for the thin lens model.

Secondly, the thin lens model shown in FIG. 7 is used to derive an expression for the optical power of the liquid part of the lens assembly at which the target object is in focus, into which the previous result can then be substituted. According to the thin lens approximation, a target object appears in focus on the image plane at distance v behind a lens with focal length f if the following holds:

$$\frac{1}{l+d_0} + \frac{1}{v} = \frac{1}{f} \Rightarrow \frac{1}{l+d_0} = \frac{1}{f} - \frac{1}{v}$$

The optical power $\delta_f$ of the fixed part of the liquid lens, i.e. the degree to which the lens converges or diverges light, is given by $1/f+1/v$. The target object will appear in focus on the image plane if and only if $$\frac{1}{l+d'_0} = \delta_f + \delta_a \Rightarrow \delta_a = \frac{1}{l+d'_0} - \delta_f \quad (2)$$

wherein $\delta_a$ denotes the ideal optical power of the liquid lens part, so that the target object is correctly in focus. Note that (2) no longer discusses the lens through which the light spot is captured, instead (2) discusses the liquid lens which needs to be focused; hence $d'_0$, i.e. the distance between the centre of the lens and the origin, is introduced.

Equations (1) and (2) are valid for both the sensor used for measuring the light spot and for the sensor of which the lens needs to be focused. The distance between the origin and the pinhole of the sensor used for measuring the light spot is denoted by $d_0$ and $d'_0$ represents the distance between the origin and the lens that needs to be focused. Combining the equations (1) and (2) for the general case where the sensor used for measuring the light spot is different from the sensor that needs to be focused, the required optical power of the liquid lens in order to have the target object in focus, becomes $$\delta_a = \frac{c(x+x_0) - v\tan\theta}{(a+l_0\tan\theta)v + (d'_0 - d_0)(c(x+x_0) - v\tan\theta)} - \delta_f$$

When using the same image sensor for measuring the light spot and for focusing, or when $(d'_0-d_0)(c(x+x_0)-v\tan\theta)$ is negligible compared to $(a+l_0\tan\theta)v$ for any pixel offset $x$, the model simplifies to the following linear equation:

$$\delta_a = \frac{c \cdot x}{(a+l_0\tan\theta)v} - \left(\frac{v\tan\theta - c \cdot x_0}{(a+l_0\tan\theta)v} + \delta_r\right) \approx \frac{c \cdot x}{a \cdot v} - \left(\frac{v\tan\theta - c \cdot x_0}{a \cdot v} + \delta_f\right)$$

The approximation can be used if the laser pointer is well-aligned with and far enough from the image sensor measuring the light spot. In such cases, the distance $l_0$ and the angle $\theta$ are very small. The factor $l_0 \tan \theta$ is then negligible compared to the length a (less than a millimeter versus a few centimeters). A lightweight formula is obtained to derive the optimal optical power of the liquid part of the lens so the target object is in focus; a formula which does not depend on the distance to the target object.

Figure 8:
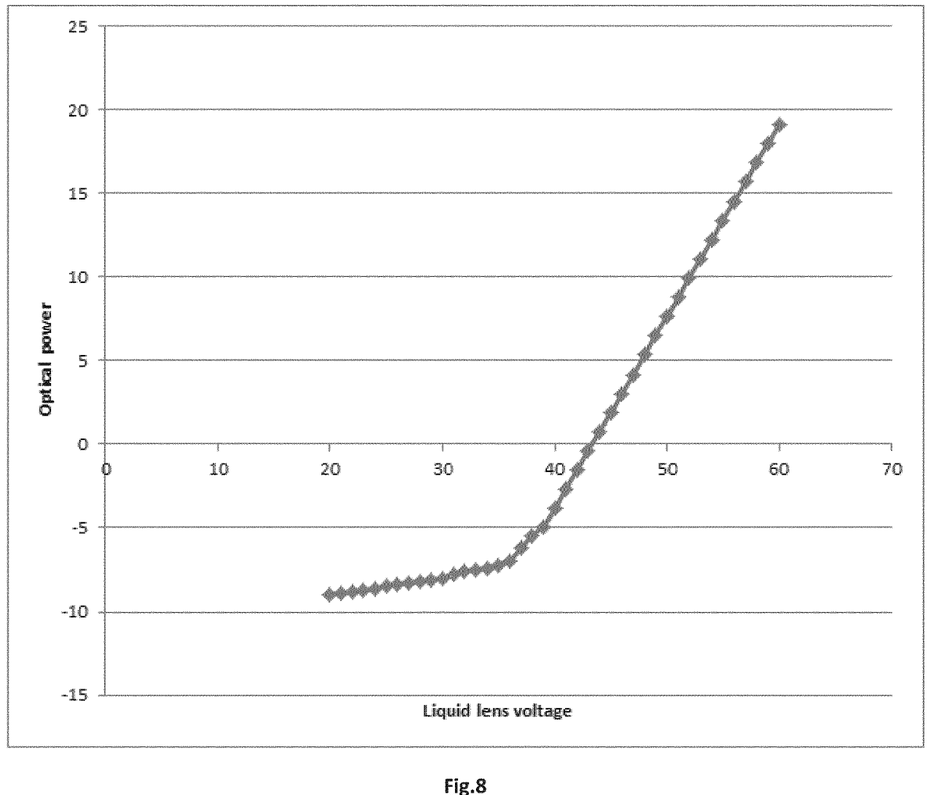
FIG. 8 illustrates a liquid lens voltage to optical power lookup graph.

The absolute optical power of a liquid lens assembly depends on the type of liquid lens and its distance to the image sensor. Therefore, a $\delta_a = f_{calib}(V)$ function can be constructed after the system has been assembled, resulting in a lookup graph which can be used to convert the optimal optical power to the voltage required to optimally configure the liquid lens. Such a graph is shown in FIG. 8. As a result, once the $f_{calib}$ function has been measured, one can find the optimal voltage for the liquid lens, based on solely the image coordinates of the light spot:

$$V_{liquidLens} = f_{calib}^{-1}\left(\frac{c \cdot x}{a \cdot v} - \left(\frac{v\tan\theta - c \cdot x_0}{a \cdot v} + \delta_f\right)\right)$$

For a liquid lens, the relation between applied voltage and resulting optical power typically depends on the ambient temperature. This means the effective optical power $\delta_{\mathit{eff}}=f_{calibTemp}$ (V,T) depends on both the voltage set on the lens, and the ambient temperature. In some cases the dependency function $f_{calibTemp}$ of the optical power on the temperature is provided by the manufacturer of the liquid lens, or it can be measured and fitted to a model. Solving this function for the voltage V, one obtains the final expression $$V_{liquidLens} = f_{calibTemp}^{-1}\left(\frac{c \cdot x}{a \cdot v} - \left(\frac{v\tan\theta - c \cdot x_0}{a \cdot v} + \delta_f\right), T\right)$$

As illustrated in FIG. 2, a temperature sensor is advantageously provided in the autofocus system. This temperature sensor is preferably located as close as possible to the liquid part of the lens.

As a side benefit, if a single sensor is used, the proposed method also provides the image coordinates of the target object on the acquired images. These are equal to the image coordinates of the light spot, assuming the sensor has not moved in between the two steps. These coordinates can be forwarded (465) to the image processing algorithms where they can provide very valuable information.

The system contains a mechanism to control the intensity of the light spot source. Because the spot is created by a directional light source, care should be taken to adhere to eye safety regulations. To this end, it can be beneficial to reduce the light output of the light source when the light spot is used as visual feedback for the user, and then to briefly increase the light power when the spot is used to detect its projection (405) and eventually its coordinates in the delta image (425). Additionally, the processor module can control peripheral devices to perform their tasks at the most optimal moment during the autofocus cycle.

Figure 9:
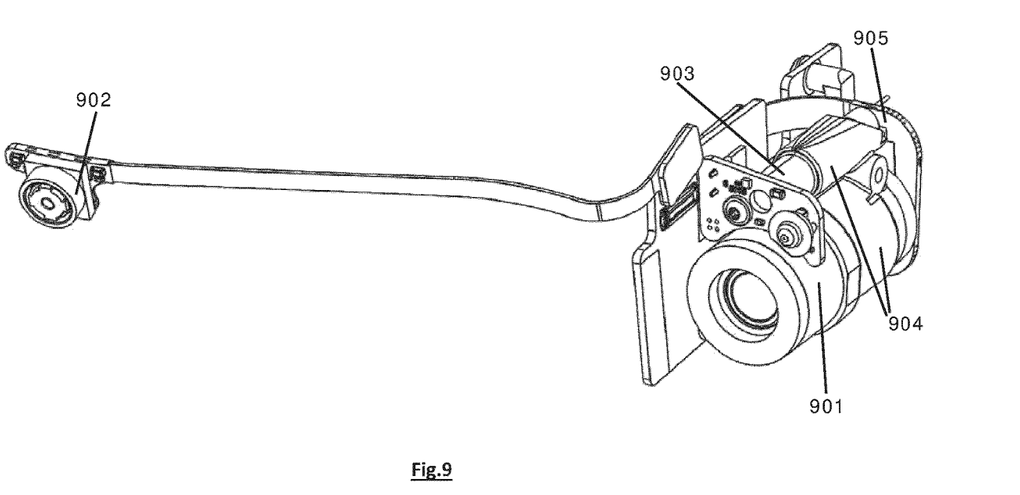
FIG. 9 illustrates an embodiment of the image sensors and light beam emitter of the head-mounted apparatus, without a housing.

FIG. 9 finally shows the first image sensor (901), second image sensor (902) and light beam emitter (903) of a head-mounted apparatus according to the invention, without any housing or the carrier (for instance glasses or goggles) it is mounted on. The light beam emitter (903) is anchored to the first image sensor (901) via a one-piece mechanical assembly or holding means (904). Also visible in the figure is a PCB (905) for driving the emitter (903) and the first image sensor (901). When implemented on a head-mounted apparatus such as smart glasses, the second image sensor (902) is positioned centrally on the glasses, at the nose/between the eyes, while the first image sensor (901) is positioned laterally at the side of the wearer's head.

It is supposed that the present invention is not restricted to any form of realization described previously and that some modifications can be added to the presented example of fabrication without reappraisal of the appended claims. For example, the present invention has been described referring to headsets, but it is clear that the invention can be applied to smart glasses for instance.

The invention claimed is:

1. Head-mounted display apparatus with autofocus system for focusing an object of interest, said object of interest being an optical, machine-readable data representation said apparatus comprising:
   a. a first image sensor adapted for capturing images, said first image sensor comprising a lens assembly with variable diopter aligned to the first image sensor;
   b. a light beam emitter for generating a light beam for marking an object of interest, thereby indicating to a user the object of interest being captured by the first image sensor, wherein the light beam emitter is mounted on the apparatus oriented with respect to the lens assembly of the first image sensor so as to emit the light beam within the field of view of the first image sensor;

c. a temperature robust, one-piece mechanical assembly fixing said light beam emitter under a constant, predetermined angle to said lens assembly of said first image sensor, wherein said temperature robust mechanical assembly comprises a material with a linear thermal expansion coefficient (a) of at most 250 10-5 per Kelvin;

d. a processor module configured for triangulating a distance from the apparatus to the object of interest requiring focus, based on images captured by said first image sensor of the head-mounted display apparatus;

e. a driver module adapted for focusing the lens assembly of the first image sensor based on said triangulated distance;

wherein the light beam emitter has a marking mode and a ranging mode, wherein the light beam emitter operates in the marking mode in absence of detection of predetermined triggers, wherein the light beam emitter in the marking mode generates an optically visible marker detectable by the human eye on the object of interest, and wherein the light beam emitter is configured for entering the ranging mode upon detection of a predetermined trigger, wherein the ranging mode comprises the light beam emitter to emit at least one, and optionally two or more subsequent, light pulses thereby creating at least one, and optionally two or more subsequent, pulsed light spot on the object of interest, wherein at least one or more of said images of the first image sensor used for triangulating the distance comprises the light spot from the light beam, wherein the processor module is adapted for determining coordinates of said light spot based on the one or more images of the first image sensor, and wherein the triangulation of the distance is furthermore based on said coordinates of the light spot;

wherein the central axes of the light beam emitter and the lens assembly of the first image sensor are distanced at least 0.10 cm from each other.

2. Head-mounted display apparatus according to the preceding claim 1, comprising a second image sensor adapted for capturing images, said second image sensor comprising a wide-angle lens assembly, and mounted wherein the light beam is emitted within the field of view of the second image sensor; the apparatus further comprising an electronic display for displaying digital images;

wherein the processor module is configured for mapping the images from the first image sensor on the images of the second image sensor based on the positions of the light spot in essentially simultaneously captured images from the first and the second image sensor;

wherein the electronic display is configured for displaying the images of the second image sensor, and wherein the electronic display is configured for displaying the images of the first image sensor in the displayed images of the second image sensor via overlay, wherein the images of the first image sensor are marked with respect to the images of the second image sensor.

3. The head-mounted display apparatus according to the claim 1, comprising a second image sensor adapted for capturing images, said second image sensor comprising a wide-angle lens assembly, and mounted wherein the light beam is emitted within the field of view of the second image sensor; the apparatus further comprising an electronic display for displaying digital images;

wherein the processor module is configured for mapping the images from the first image sensor on the images of the second image sensor, said mapping being based on offset and angle between the lens assembly of the first image sensor and the lens assembly of the second image sensor, said offset and angle being: predetermined; or derivable from at least two simultaneous successful detections of the light spot in images of both the first and the second image sensor;

wherein the electronic display is configured for displaying the images of the second image sensor, and wherein the electronic display is configured for displaying the images of the first image sensor in the displayed images of the second image sensor via overlay, wherein the images of the first image sensor are marked with respect to the images of the second image sensor.

4. The head-mounted display apparatus according to the claim 3, wherein the processor module is configured to map the images based on said predetermined or derived angle and offset, by detecting the light spot in images from the first image sensor; subsequently determining the distance from the lens assembly of the first image sensor to the surface which the light spot marks; based on said determined distance and the predetermined or derived angle and offset, calculating the position of the light spot in images from the second image sensor; based on the said calculated position, map the images of the first image sensor on the images of the second image sensor.

5. The head-mounted display apparatus according to claim 2, wherein the images of the first image sensor are marked with respect to the images of the second image sensor via a rectangular demarcation.

6. The head-mounted display apparatus according to claim 2 wherein the light beam emitter and the second image sensor are spatially separated over at least 25% of the breadth of the apparatus.

7. The head-mounted display apparatus according to claim 2, wherein the lens assembly of the first image sensor and the lens assembly of the second image sensor are distanced over at least 4.0 cm.

8. The head-mounted display apparatus according to claim 1, wherein the predetermined triggers comprise movement of the apparatus over a predetermined time being below a predetermined amount, indicating a user maintains the position of the apparatus.

9. The head-mounted display apparatus according to claim 1, wherein said mechanical assembly comprises a material with a linear thermal expansion coefficient (a) of at most $125 \cdot 10^{-5}$ per Kelvin.

10. The head-mounted display apparatus according to claim 1, wherein said mechanical assembly comprises acrylonitrile butadiene styrene (ABS).

11. The head-mounted apparatus according to claim 1, wherein the central axes of the light beam emitter and the lens assembly of the first image sensor are distanced at least 0.10 cm from each other.

12. The head-mounted display apparatus according to claim 1, wherein the lens assembly of the first image sensor is provided with a temperature sensor adapted for measuring the temperature of said lens assembly and whereby the focusing of said lens assembly takes said measured temperature into account.

13. The head-mounted display apparatus according to claim 1, the apparatus comprise an accelerometer for providing acceleration input to the processor module, whereby the processor module is adapted to engage in a scanning modus upon detection of a threshold of stability over a certain time length from the input of the accelerometer, said scanning modus comprising the triangulation of the distance between the apparatus and the light spot, and subsequently the focusing of the lens assembly of the first image sensor based on said triangulated distance.

14. The head-mounted display apparatus according to claim 1, comprising a flash LED module substantially aligned with the light beam emitter and the lens assembly of the first image sensor, whereby the processor module is adapted to control said flash LED module for illuminating the field of view of the first image sensor.

15. The head-mounted display apparatus according to claim 1, wherein the head-mounted display apparatus comprises smart glasses.

16. The head-mounted display apparatus according to claim 2, wherein the central axes of the lens assemblies of the first and second image sensor are variably angled.

17. The head-mounted display apparatus according to claim 1, wherein the processor module is adapted to manipulate the angulation of the first image sensor, thereby shifting the field of view thereof.

* * * * *